(12) United States Patent
Guillez et al.

(10) Patent No.: US 6,830,283 B2
(45) Date of Patent: Dec. 14, 2004

(54) FOLDING ROOF IN PARTICULAR FOR STATION WAGON, WITH PIVOTING ARMS AND LEVERS

(75) Inventors: Jean-Marc Guillez, Cirieres (FR); Gérard Oueveau, Amik (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/451,438

(22) PCT Filed: Nov. 28, 2001

(86) PCT No.: PCT/FR01/03761
§ 371 (c)(1),
(2), (4) Date: Jun. 20, 2003

(87) PCT Pub. No.: WO02/49864
PCT Pub. Date: Jun. 27, 2002

(65) Prior Publication Data
US 2004/0051342 A1 Mar. 18, 2004

(30) Foreign Application Priority Data
Dec. 21, 2000 (FR) .............................. 0016795

(51) Int. Cl.⁷ .................................................. B60J 7/08
(52) U.S. Cl. .................... 296/108; 296/107.17
(58) Field of Search ........................ 296/107.17, 108, 296/107.16, 116

(56) References Cited

U.S. PATENT DOCUMENTS

| | | | | |
|---|---|---|---|---|
| 2,705,225 A | * | 3/1955 | Kowolik et al. | ............. 524/208 |
| 6,336,673 B1 | * | 1/2002 | Rothe et al. | ............. 296/107.17 |
| 6,481,781 B2 | * | 11/2002 | Bergerhoff et al. | ..... 296/107.17 |

* cited by examiner

*Primary Examiner*—Joseph D. Pape
(74) *Attorney, Agent, or Firm*—Nawrocki, Rooney & Sivertson, P.A.

(57) ABSTRACT

A retractable roof for a vehicle has three rigid roof sections. A plurality of links and levers connect to the three roof sections and control and guide the three roof sections in an optimal manner as they move from a closure position covering a compartment of the vehicle to a storage position in a rear boot of the vehicle.

6 Claims, 1 Drawing Sheet

FOLDING ROOF IN PARTICULAR FOR STATION WAGON, WITH PIVOTING ARMS AND LEVERS

CROSS-REFERENCE TO RELATED APPLICATIONS

None

STATEMENT REGARDING FEDERALLY SPONSORED RESEARCH OR DEVELOPMENT

None

INCORPORATED-BY-REFERENCE OF MATERIAL SUBMITTED ON A COMPACT DISC

None

BACKGROUND OF THE INVENTION

1. Field of the Invention

The present invention concerns a roof which can be folded away or retracted in the rear boot of a vehicle.

A retractable roof of this type can in particular convert a vehicle of the 2-seater coupé type or 4-seater coupé or saloon into a vehicle of the cabriolet type.

In the case of 4-seater coupés or saloons, the roof has a relatively long length, so that the retractable roof is composed of three elements, each of which has a length compatible with the dimensions of the vehicle boot.

2. Description of Related Art Including Information Disclosure Under 37 CFR 1.97 and 1.98

Thus a retractable roof for a vehicle is known, comprising a front roof element, an intermediate roof element and a rear roof element, these three elements being able to move between a position in which they cover the vehicle and a position in which they are superimposed substantially horizontally in the rear boot of the vehicle.

BRIEF SUMMARY OF THE INVENTION

The invention relates more particularly to a retractable roof, particularly for a vehicle such as station wagon. The roof comprises a front rigid roof element, an intermediate rigid roof element and a rear rigid roof element, the latter being situated close to the rear top edge of the rear boot of the vehicle.

The aim of the present invention is to afford improvements to the known means, for controlling and guiding the movement of the roof element optimally between their closure position and their position of storage in the boot.

According to the invention, the retractable roof is characterised in that the rear element is connected in an articulated fashion close to the top rear edge of the rear boot so as to be able to tilt forwards inside the rear boot, in that the intermediate element is connected in an articulated fashion on the one hand to a pivoting arm articulated on the bodywork, at a point situated close to the front top edge of the boot, and on the other hand to a lever articulated on this intermediate element and on the rear element, in that the intermediate element is connected to the front element by two articulated levers, first connection means being provided for controlling the pivoting of these two levers in order to make the front element pass over the intermediate element, when the said pivoting arm pivots towards the rear, and second connection means being provided for controlling the tilting of the rear element forwards and towards the boot, when the said pivoting arm pivots towards the rear.

The said first connection means preferably comprise a link connecting the said pivoting arm in an articulated fashion to one of the levers connecting the intermediate element to the front element.

Preferably also, the said second means comprise a connecting rod connecting in an articulated fashion an extension of the pivoting arm situated beyond its point of articulation on the bodywork and the rear part of the rear element at a point spaced apart from the articulation thereof on the bodywork.

Other particularities and advantages of the invention will also emerge from the following description.

BRIEF DESCRIPTION OF THE SEVERAL VIEWS OF THE DRAWING(S)

In the accompanying drawings, given by way of non-limiting examples:

DETAILED DESCRIPTION OF THE INVENTION

Figure 1:
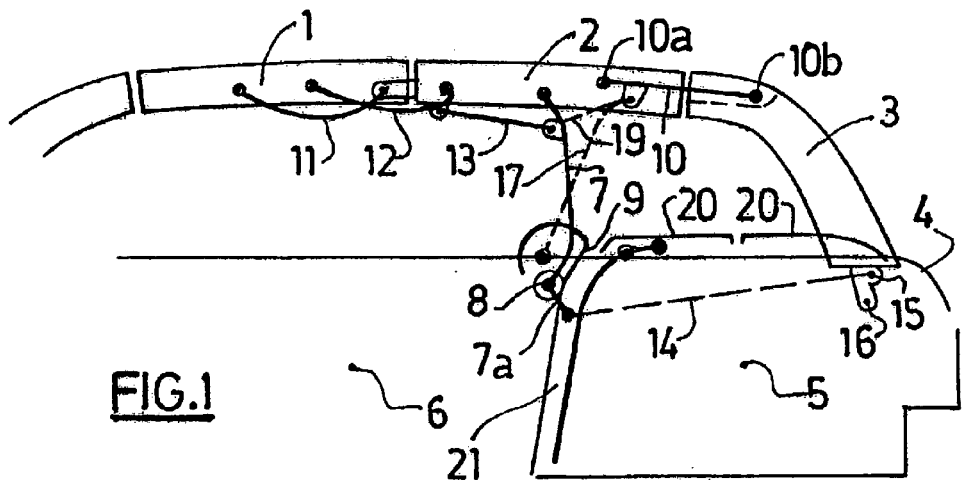
FIG. 1 is a schematic view in partial longitudinal section of a vehicle equipped with a retractable roof according to the invention, in the closed position.
Figure 2:
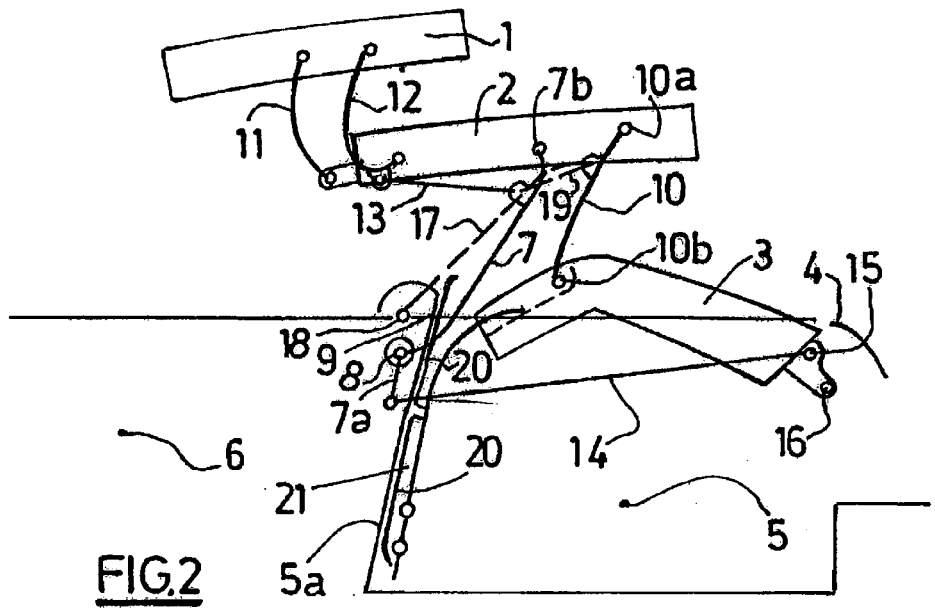
FIG. 2 is a view similar to FIG. 1, the retractable roof being in an intermediate position.
Figure 3:
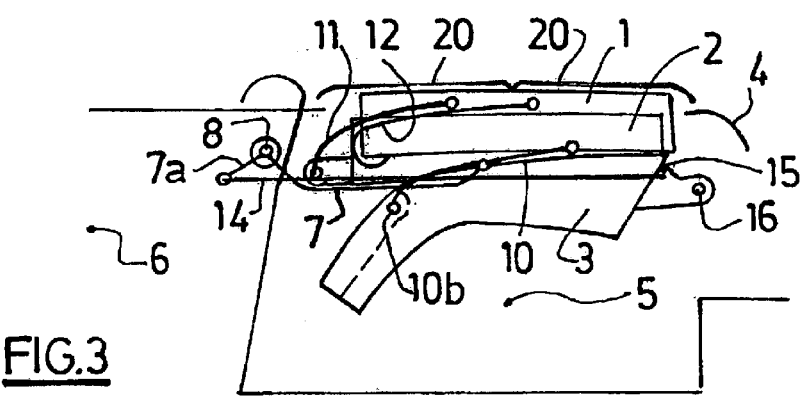
FIG. 3 is a view similar to FIGS. 1 and 2, the retractable roof being in the position stored in the vehicle boot.

In the embodiment depicted in FIGS. 1 to 3, the retractable roof for a vehicle comprises a front roof element 1, an intermediate roof element 2, and a rear roof element 3. These three elements 1, 2, 3 are able to move between a position in which (see FIG. 1) they cover the cabin 6 of the vehicle and a position in which (see FIG. 3) they are superimposed substantially horizontally in the rear boot 5 of the vehicle.

The vehicle depicted being of the station wagon type, the rear rigid roof element (3) is situated close to the rear top edge (4) of the rear boot (5) of the vehicle.

According to the invention, the rear element (3) is connected in an articulated fashion at 16 close to the top rear edge (4) of the rear boot (5) so as to be able to tilt forwards inside the rear boot (5). The intermediate element (2) is connected in an articulated fashion at 7b on the one hand to a pivoting arm (7) articulated on the bodywork, at a point (8) situated close to the front top edge (9) of the boot (5), and on the other hand on a lever (10) articulated at 10a on this intermediate element (2) and at 10b on the rear element (3).

The intermediate element (2) is connected to the front element (1) by two articulated levers (11, 12). First connection means are provided for controlling the pivoting of these two levers (11, 12) in order to make the front element (1) pass over the intermediate element (2), when the said pivoting arm (7) pivots towards the rear. Moreover, second connection means are provided for controlling the tilting of the rear element (3) forwards and towards the boot (5), when the said pivoting arm (7) pivots towards the rear.

In the example depicted, the first connection means comprise a link (13) connecting the said pivoting arm (7) in an articulated fashion to one (12) of the levers (11, 12) connecting the intermediate element (2) to the front element (1).

In the example depicted, the said second means comprise a connecting rod (14) connecting in an articulated fashion an extension (7a) of the pivoting arm (7) situated beyond its articulation point (8) on the bodywork and the rear part of the rear element (3) at a point (15) spaced apart from the articulation (16) thereof on the bodywork.

By way of variant, the first connection means comprise a lever (17) articulated on one (10) of the levers connecting the rear element (3) and the intermediate element (2) and articulated at a fixed point (18) on the chassis.

In another variant, the connection means comprise a link (19) articulated on the arm (7) and on one (10) of the levers connecting the rear (3) and intermediate (2) elements.

It can also be seen in FIGS. 1 to 3 that the top face of the rear boot (5) adjacent to the inside of the cabin (6) of the vehicle comprises one or more panels (20) able to be moved between a position (see FIG. 1) in which they close off the said face and a position (see FIG. 2) in which they leave the said face clear to enable the roof elements (1, 2, 3) to pass and are stored in a space (21) adjacent to the front wall (5a) of the boot (5).

The retractable roof which has just been described functions as indicated below.

When the roof is in the closed position, the elements (1), (2), (3) are locked on one another and on fixed parts of the bodywork.

The top face of the boot is closed off by panels (20).

To open the roof, the first step is to unlock the elements (1), (2) and (3) and to move the panels (20) into the space (21) situated inside the boot (5).

The movement of the panels (20) towards the boot can be controlled automatically by means of a device which is not shown.

The pivoting of the arm (7) towards the rear is then controlled.

The movement of the arm (7) controls the rearward movement of the intermediate element (2) and the tilting of the rear element (3) forwards and towards the boot by virtue of the levers (10) and (14).

The tilting of the arm (7) towards the rear controls, by means of the link (13), the upward pivoting of the levers (11, 12), which have the effect of raising the front element (1) and making it pass over the intermediate element (2).

At the end of travel, the elements (3), (2), (1) are stored in the rear boot so as to be superimposed and substantially horizontal.

It is then possible to replace the panels (20) in order to close off the top part of the rear boot which is adjacent to the cabin (6).

What is claimed is:

1. A retractable roof for a vehicle, comprising a front rigid roof element (1), an intermediate rigid roof element (2) and a rear rigid roof element (3), the latter being situated close to a rear top edge (4) of a rear boot (5) at the rear of the vehicle, the roof elements (1, 2, 3) being able to be moved between a position in which they cover a cabin (6) of the vehicle and a position in which they are stored in the rear boot (5), characterized a) in that the rear roof element (3) is connected in an articulated fashion close to the rear top edge (4) of the rear boot (5) so as to be able to tilt forwards inside the rear boot (5), b) in that the intermediate roof element (2) is connected in an articulated fashion to a pivoting arm (7) articulated on the bodywork, at a point (8) situated close to a front top edge (9) of the rear boot (5), and to a lever (10) articulated on the intermediate roof element (2) and on the rear roof element (3), and c) in that the intermediate roof element (2) is connected to the front roof element (1) by a plurality of articulated levers (11, 12), first connection means being provided for controlling the pivoting of the articulated levers (11, 12) in order to make the front roof element (1) pass over the intermediate roof element (2), when the pivoting arm (7) pivots towards the rear, and second connection means being provided for controlling the tilting of the rear roof element (3) forwards and towards the rear boot (5), when the pivoting arm (7) pivots towards the rear of the vehicle.

2. A retractable roof according to claim 1, characterised in that the first connection means comprises a link (13) connecting the pivoting arm (7) in an articulated fashion to at least one (2) of the articulated levers (11, 12) connecting the intermediate roof element (2) to the front roof element (1).

3. A retractable roof according to claim 1, characterised in that the second connection means comprises a connecting rod (14) connecting in an articulated fashion to an extension (7a) of the pivoting arm (7) situated beyond its point of articulation (8) on the bodywork and to the rear part of the rear element (3) at a point (15) spaced apart from the articulation (16) thereof on the bodywork.

4. A retractable roof according to claim 1, characterised in that the first connection means comprises a lever (17) articulated on the lever (10) articulated on the rear roof element (3) and the intermediate roof element (2) and articulated on a fixed point (18) of the chassis.

5. A retractable roof according to claim 1, characterised in that the first connection means comprise a link (19) articulated on the arm (7) and on the lever (10) articulated on the rear (3) and intermediate (2) roof elements.

6. A retractable roof according to claim 1, characterised in that a top face of the rear boot (5) adjacent to the inside of the cabin (6) of the vehicle comprises at least one panel (20) able to be moved between a position closing off the top face and a position leaving the top face clear to allow passage of the roof elements (1, 2, 3) and are stored in a space (21) adjacent to a front wall of the rear boot (5).

* * * * *